United States Patent [19]

Kanda

[11] 4,288,281
[45] Sep. 8, 1981

[54] APPLIANCE FOR ADHERING A SENSING MARKER ON A MEDIUM FOR RECORDING INFORMATION

[75] Inventor: Kaoru Kanda, Yokohama, Japan

[73] Assignee: Sigma Corporation, Tokyo, Japan

[21] Appl. No.: 75,243

[22] Filed: Sep. 12, 1979

[30] Foreign Application Priority Data

| Sep. 28, 1978 | [JP] | Japan | 53-118666 |
| Sep. 28, 1978 | [JP] | Japan | 53-118667 |
| Oct. 13, 1978 | [JP] | Japan | 53-125075 |
| Mar. 2, 1979 | [JP] | Japan | 54-23435 |

[51] Int. Cl.³ .............................................. B44C 7/02
[52] U.S. Cl. .................................... 156/540; 156/541; 156/542; 156/577; 156/579; 156/584; 221/73; 226/96; 226/127
[58] Field of Search ............... 156/577, 584, 579, 541, 156/540, 542, 580, DIG. 33, DIG. 48; 221/73; 226/96, 127

[56] References Cited

U.S. PATENT DOCUMENTS

| 2,290,365 | 7/1942 | Wynne | 156/540 |
| 2,747,479 | 5/1956 | Babcock et al. | 156/540 |
| 3,658,618 | 4/1972 | Gramann | 156/579 |
| 3,682,743 | 8/1972 | Cleary et al. | 156/584 |
| 3,740,299 | 6/1973 | Schroter et al. | 156/584 |
| 3,833,448 | 9/1974 | Gates et al. | 156/584 |

FOREIGN PATENT DOCUMENTS

| 2362897 | 6/1975 | Fed. Rep. of Germany | 156/541 |
| 7113510 | 10/1972 | Netherlands | 156/579 |

Primary Examiner—John J. Gallagher
Attorney, Agent, or Firm—Cushman, Darby & Cushman

[57] ABSTRACT

An appliance for adhering a sensing marker on a medium for recording information, such as a magnetic tape, comprising a case, removing rotor, and a guide way. The case has a cavity formed therein where the removing rotor is pivotally supported. The removing rotor also has a cavity therein where a marker roll is accommodated which is commercially available and which includes a backing liner and a plurality of pre-cut sensing markers adhered on the backing liner. The removing rotor has a station which is formed in a flat surface for receiving the backing liner withdrawn from the marker roll. An arc surface and a radial step are also provided with the removing roller. A location is formed on the case so that the magnetic tape is positioned there. A transfer block which has a rectangular shape is formed at the bottom thereof. Soft material which has a tendency to stick to the sensing marker is positioned on the block. The block is pressed to the sensing marker positioned on the flat surface of the removing rotor so that the sensing marker sticks to the soft material mounted on the block. Thereafter, the block together with the sensing marker is pressed to the magnetic tape and the sensing marker is adhered to the tape.

7 Claims, 13 Drawing Figures

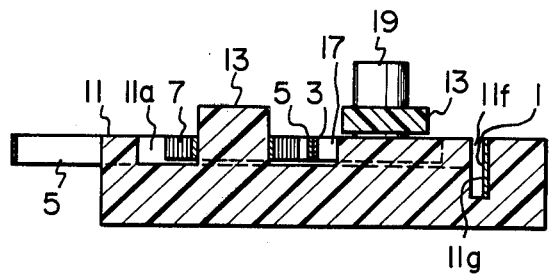
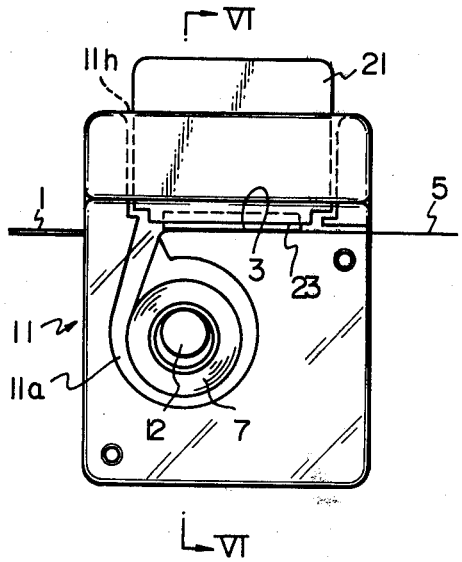
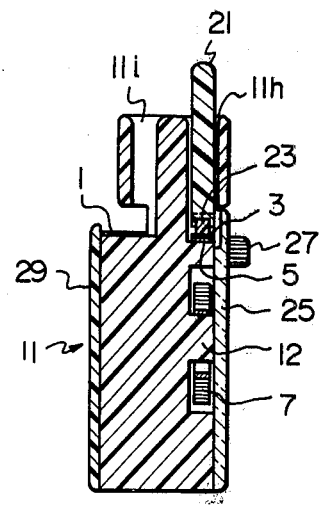

APPLIANCE FOR ADHERING A SENSING MARKER ON A MEDIUM FOR RECORDING INFORMATION

BRIEF DESCRIPTION OF THE INVENTION

This invention relates to an appliance for adhering a sensing marker on a medium for recording information, such as a magnetic tape or card for use in an electric computer.

BACKGROUND OF THE INVENTION

In a modern data processing unit, such as an electric computer, a magnetic tape or card is generally used as a medium for recording information. In this case, a sensing marker which has a predetermined length and width and which is of a thin film having an aluminum layer deposited thereon in a vacuum is adhered on a magnetic tape or card at a predetermined position according to the rules in Industrial Standards, such as JIS, so that the beginning of the tape or the end of tape can be detected by detecting the sensing marker.

After such magnetic tape has been repeatedly used, the ends of the tape, particularly the beginning end of the tape, may become damaged, and then, it becomes very difficult to properly thread the tape in a magnetic tape unit of an electric computer. To facilitate easy threading of the tape, certain lengths of the damaged tape ends are cut. However, after several cutting operations, the distances between the ends of the tape and the sensing markers become too short to satisfy the above-mentioned rules, and then, it is impossible to thread the tape in the magnetic tape unit. Accordingly, it is necessary that new sensing markers are adhered again on the tape.

In a conventional method, a sensing marker is manually removed from a backing liner without any assistance of an appliance by holding one end of the sensing marker by means of fingers of one hand and by pulling the liner straight down by means of fingers of the other hand. The removed sensing marker is then applied to the back side of the magnetic tape as close to the edge as practical without overlapping therewith. However, it is a very troublesome operation because the sensing marker is thin and flexible, and therefore, the sensing marker may be creased easily. When the sensing marker is improperly applied to the magnetic tape, a certain length of the tape should be cut again because the removal of the sensing marker from the tape is not easy.

SUMMARY OF THE INVENTION

An object of the present invention is to provide an appliance for easily adhering a thin sensing marker on a medium for recording information. According to the present invention, the object is achieved by an appliance which comprises a case for accommodating a marker roll, and a transferring member having a soft material mounted thereon for removing the sensing marker from the backing liner withdrawn from the marker roll and for transferring the sensing marker to the information recording medium. Because the sensing marker is removed from the backing liner by means of not fingers but a soft material which is mounted on the transferring member and which has a tendency to stick to a sensing marker thereon, creases are not created during the adhering operation, and it is easy to properly position the sensing marker on the magnetic tape.

In an embodiment of the present invention, the transferring member is formed in a roller which has the soft material at the circular periphery thereof and which is rotatably supported on one end of a pivotal lever. As a result of the rotation of the roller and the swing of the lever, the sensing marker is removed from the backing liner and is applied to the magnetic tape.

In another embodiment of the present invention, the transferring member has a flat surface on which the soft material is mounted. The member is pressed on the sensing marker on the backing liner and is then moved away from the liner; as a result, the sensing marker is removed from the liner. The member with the removed marker is then pressed on the magnetic tape, and the marker is applied to the tape.

BRIEF DESCRIPTION OF THE DRAWINGS

Further objects and advantages of the present invention will be apparent from the following description with reference to the accompanying drawings, wherein

FIG. 4 is a cross sectional view taken along line IV—IV in FIG. 3;

FIG. 5 is an elevational view of the second embodiment of the present invention wherein a transparent cover is removed;

FIG. 6 is a cross sectional view taken along line VI—VI in FIG. 5;

DETAILED DESCRIPTION OF THE INVENTION

Figure 1:
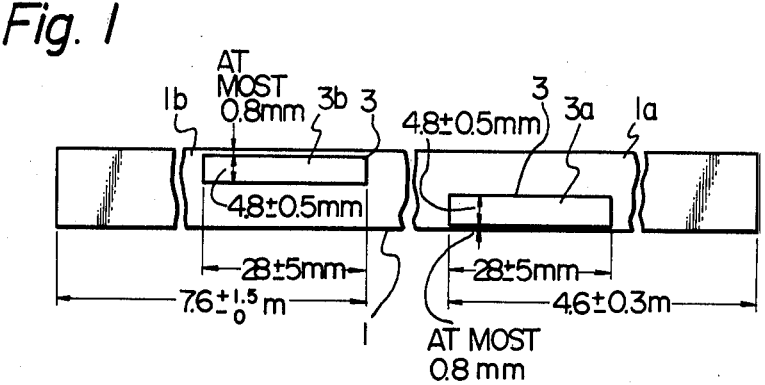
FIG. 1 is an explanatory view which is utilized to clarify the Japanese Industrial Standard (JIS) concerning a sensing marker.

The rules concerning a magnetic tape for an information interchange prescribed in the Japanese Industrial Standard (JIS) No. C-6240-1970 will now be explained with reference to FIG. 1. At the beginning end region $1a$ and the rear end region $1b$ of a magnetic tape 1, which has a width of one half inch, sensing markers 3 should be adhered so that the beginning end region and rear end region of the magnetic tape 1 can be detected by equipment which processes the information stored on the tape 1. The sensing marker 3 which is adhered to the beginning end region $1a$ will be referred to hereinafter as the BOT marker, BOT being the abridgment of "beginning of tape", and will be designated by a reference numeral $3a$. Similarly, the sensing marker 3 which is adhered to the rear end region $1b$ will be referred to hereinafter as the EOT marker, EOT being the abridgement of "end of tape", and will be designated by a reference numeral 3b. The positions where the sensing markers 3 are adhered are illustrated in FIG. 1, more specifically, the rear end of the sensing marker 3 for BOT 3a must be in a range between 4.3 m and 4.9 m from the beginning end of the tape 1, and similarly, the distance between the front end of the sensing marker 3 for EOT 3b must be in a range between 7.6 m and 9.1 m. The distance between the outer edge of the sensing marker 3 and the edge of the magnetic tape 1 must be at most 0.8 mm and the edge of the sensing marker 3 must not exceed the edge of the magnetic tape 1. The size of the sensing markers 3 are the same, and the width and the length of the sensing marker 3 should be 4.8±0.5 mm, 28±5 mm, and the thickness of the marker 3 should not exceed 0.02 mm.

Figure 2:
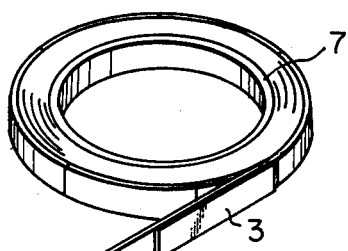
FIG. 2 is a perspective view of a marker roll which is employed in an appliance of the present invention.

The sensing markers 3 are commercially available, and they are usually made of a thin plastic film having an aluminum layer deposited thereon in a vacuum and having adhesion on the back sides thereof. As illustrated in FIG. 2, commercially available sensing markers 3 which are cut in a predetermined length, are usually adhered to a backing liner 5 which is made of plastic film or paper subjected to a surface treatment, such as a paraffin coating, so that they can be easily removed from the backing liner 5. The backing liner 5 together with a plurality of pre-cut segments, that is each segment being a sensing marker 3 having a length of 28 mm, is wound around a marker roll 7 which is made of plastic, such as nylon.

When such a sensing marker 3 is manually removed from the backing liner 5, and then, the removed marker 3 is adhered on a magnetic tape 1 (FIG. 1) as the BOT or EOT marker, the manual removing and adhering operation is very troublesome, as described hereinbefore.

Figure 3:
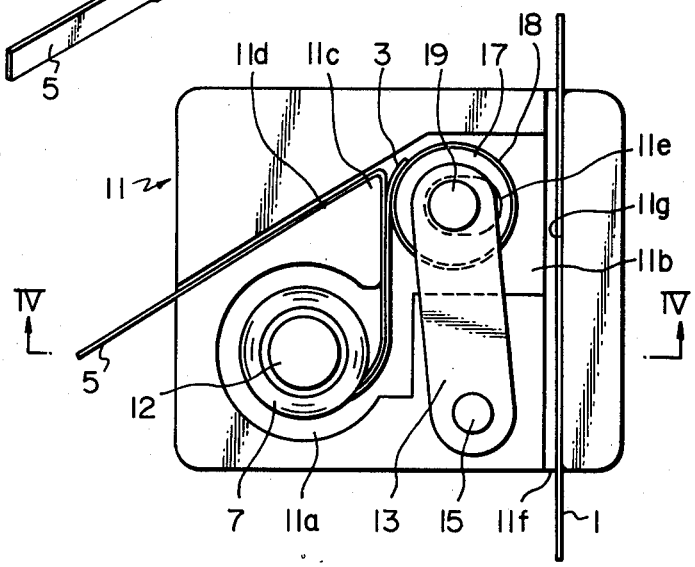
FIG. 3 is an elevational view of the first embodiment of the present invention wherein a transparent cover is removed.

Referring to FIG. 3, which illustrates the first embodiment of the present invention, an appliance of the first embodiment comprises a case 11 of plastic. The case 11 has a cavity 11a of a substantially circular shape formed therein. A circular pin 12 projects from the center of the cavity 11a so that the marker roll 7 which has the backing liner 5 and a plurality of sensing markers 3 wound therearound is rotatably inserted onto the pin 12. A reverse L-shaped cavity 11b is tangentially connected to the circular cavity 11a so that the side surface 11c of the cavity 11b forms a removing station. The upper end of the side surface 11c is connected to a channel 11d for leading the backing liner 5, from which the sensing marker 3 has been removed, forming an acute angle therebetween. A lever 13 made of plastic is swingably pivoted in the case 11 by a pivot pin 15. On the upper end of the lever 13, a roller 17 which is made of plastic is rotatably supported by a support pin 19 which is formed in one body with the roller 17, and as a result, when the support pin 19 is rotated, the roller 17 also rotates. The lower end of the support pin 19 is inserted into a shallow groove 11e formed on the bottom surface of the L-shaped cavity 11b. A layer of a soft material 18 which is of a synthetic rubber, such as soft silicon rubber, or of a plastic, such as a soft polyvinyl chloride acetate copolymer containing a large amount of plasticizer, for example, "NONSLIP" (Registered Trade Mark) pads, manufactured and sold by Spirig, Switzerland, is adhered or coated on the peripheral surface of the roller 17, and has a tendency to stick to a sensing marker 3 as described hereinbelow. A straight groove 11f which has a rectangular cross section and which is utilized for guiding a magnetic tape 1 to be processed extends across the case 11 at a position adjacent to the L-shaped cavity 11b; as a result, the side surface 11g which is opposite to the side surface 11c forms an adhering location.

After the marker roll 7 is inserted onto the pin 12, the backing liner 5 is withdrawn together with the sensing marker 3 from the marker roll 7, and when the first sensing marker 3 reaches the side surface 11c, the backing liner 5 is positioned there. Thereafter, the roller 17 is pressed to the sensing marker 3 positioned at the side surface 11c by swinging the lever 13 by means of an urging force exerted on the support pin 19; as a result, the sensing marker 3 sticks on the soft material 18 mounted on the roller 17. As the end of the backing liner 5 is pulled outwards and as the roller 17 is clockwisely rotated by rotating the supporting pin 19, the sensing marker 3 is removed from the backing liner 5 because the adhesive force between the sensing marker 3 and the backing liner is weak. The sharp edge formed between the side surface 11c and the channel 11d facilitates the removal of the sensing marker 3 from the backing liner 5. However in some cases, the channel may be formed so that it is aligned with the side surface 11c, if the adhesive force between the sensing marker 3 and the backing liner 5 is not strong. After almost the entire sensing marker 3 sticks to the soft material 18 mounted on the roller 17, and after the magnetic tape 1 is prepared in the straight groove 11f, the lever 13 is swung toward the magnetic tape 1 and is pressed to it. As a result, the sensing marker 3 is adhered to the magnetic tape positioned at the side surface because the sensing marker 3 has adhesion on the back surface thereof.

Note that when the sensing marker 3 is adhered to the magnetic tape 1 as the BOT marker, the magnetic tape 1 is positioned in the straight groove 11f so that the lower edge of the magnetic tape 1 as shown in FIG. 1, is positioned above, and that when the sensing marker 3 is adhered to the magnetic tape 1 as the EOT marker, the magnetic tape 1 is positioned in the straight groove 11f so that the lower edge is positioned below. The depth of the straight groove 11f is so arranged that the sensing marker 3 is adhered to the magnetic tape 1 at a position within the prescribed range.

It is preferable that the width of the soft material 18 mounted on the roller 17 is equal to or smaller than that of the sensing marker 3. If this condition is satisfied, when the roller 17, on which the sensing marker 3 sticks, is pressed to the magnetic tape 1, only the back side of the sensing marker 3 contacts the magnetic tape 1 and the soft material 18 which has a tendency to stick not only to the sensing marker 3 but also to the magnetic tape 1 does not contact the magnetic tape 1. As a result, when the roller 17 is swung counterclockwise, the soft material 18 does not pull the magnetic tape 1 outwards, and the sensing marker properly remains on the magnetic tape 1.

The second embodiment of the present invention will now be explained with reference to FIG. 5. Instead of the roller 17 in the first embodiment, a transfer block 21 having a rectangular shape and made of plastic is used. The block 21 has a flat bottom where a flat soft material 23 is adhered. The quality of the material 23 is the same as that of the material 18. The parts are the same as those in FIGS. 3 and 4 and are designated by the same reference numerals as those in FIGS. 3 and 4. As illustrated in FIG. 6, the top portion of the case 11 is provided with a pair of parallel guide grooves 11h and 11i, the width of which is slightly larger than that of the block 21 so that the block 21 can be slid within the guide grooves 11h and 11i. In the second embodiment, the bottom surface of the guide groove 11h extends horizontally as illustrated in FIG. 5 and is tangentially connected to the circular cavity 11a. A transparent cover 25 (FIG. 6) made of plastic is secured to the case 11 by means of a pair of screws 27 (only one is illustrated). The top portion of the cover 25 which is positioned at the bottom of the guide groove 11h is chamferred so that the width of the bottom of the guide groove 11h is equal to that of the backing liner 5 on which the sensing marker 3 is adhered. The top of a plate 29 which is positioned at the bottom of the guide groove 11i extends upwards so that the width of the bottom of the guide groove 11h is equal to that of the magnetic tape.

After the cover 25 is detached from the case 11, the marker roll 7 is inserted onto the pin 12, and then the backing liner 5 withdrawn from the marker roll 7 is horizontally guided along the bottom of the guide groove 11h until the first sensing marker 3 on the backing liner 5 is positioned at the bottom of the guiding groove 11h. Thereafter, the transfer block 21 having the soft material 23 is pressed to the sensing marker 3 positioned at the bottom of the guiding groove 11h, and the sensing marker 3 is stuck to the soft material 23. After the transfer block 21 is pulled out from the guiding groove 11h together with the sensing marker 3, it is again inserted into the guiding groove 11i and pressed to the magnetic tape 1 which has been positioned at the bottom of the guiding groove 11i. Accordingly, the sensing marker 3 adheres to the magnetic tape 1. The backing liner 5 is then pulled so that a new sensing marker is positioned at the bottom of the guiding groove 11h.

It is preferable that the width of the soft material 23 is equal to or smaller than that of the sensing marker 3, as illustrated in FIG. 6. It should be noted that the positional relationships between the transfer block 21 and the sensing marker 3 at the bottom of the guiding groove 11h, and the transfer block 21 and the magnetic tape 1, are so selected that the sensing marker 3 becomes adhered to the magnetic tape to satisfy the prescribed rules illustrated in FIG. 1.

The third embodiment of the present invention will now be explained with reference to FIGS. 7 and 8. The third embodiment is very similar to the second embodiment illustrated in FIGS. 5 and 6 except that a removing rotor 31 is pivotably supported in the cavity 11a of the case 11 and that the marker roll 7 is inserted onto a pin 31a projecting from the removing rotor 31. Accordingly, parts are the same as those in FIGS. 5 and 6 and are designated by the same reference numerals as those in FIGS. 5 and 6 and their detailed explanation is omitted here. The removing rotor 31 has a substantially circular shape and a flat surface 31b formed at the upper portion thereof. The flat surface 31b functions as a station for removing the sensing marker 3 from the backing liner 5. A vertical slit 31c formed at the left end of the flat surface 31b so that a path for leading the backing liner 5 withdrawn from the marker roll 7 intersects the flat surface 31b forming an edge 31e of an acute angle, and an edge 31f is formed opposite to the acute edge 31e. Thus, the path communicates the cavity 31d formed within the removing rotor 31 with the out side. The acute edge 31e and the opposing edge 31f facilitate the removal of the sensing marker 3 from the backing liner 5 when the removing rotor 31 is swung clockwise. As illustrated in FIG. 8, the lower end of the pin 31a is pivotably inserted into a recess 33a formed on a rear cover 33, which is made of plastic. The stop ring 35 fixed on the pin 31a prevents the pin 31a from detaching from the recess 33a.

After the marker roll 7 is inserted onto the pin 31a, the backing liner 5 is pulled out from the marker roll 7 until the first sensing marker 3 is positioned on the flat surface 31b. The transfer block 21 is pressed to the sensing marker 3 positioned on the flat surface 31b so that the sensing marker 3 sticks to the soft material 23 mounted on the transfer block 21. As the removing rotor 31 is gradually rotated in a clockwise direction, the backing liner 5 is removed from the sensing marker 3 from the trailing edge thereof to the leading edge thereof. After the backing liner 5 is entirely removed from the sensing marker 3, the transfer block 21 is pulled out from the guiding groove 11h, and then the sensing marker 3 is inserted into the guiding groove 11i and it is pressed to the magnetic tape 1 which has been positioned at the bottom of the guiding groove 11i. As a result, the sensing marker 3 transferred by the transfer block 21 is adhered to the magnetic tape 1. The removing rotor 31 is then returned to its original position by rotating in a counterclockwise direction, and thereafter, the backing liner 5 is pulled out until the next sensing marker 3 is positoned on the flat surface 31b.

In the illustrated third embodiment, the marker roll 7 is accommodated within the cavity 31d formed within the removing rotor 31; however, alternatively it is possible that the marker roll 7 is accommodated within a cavity separately formed in the case. In the latter case, the backing liner is withdrawn from the marker roll and is led in a direction opposite to that illustrated in FIG. 7, and it is necessary that the removing rotor has a further slit so that the backing liner 5 is withdrawn from the cavity of the removing rotor. However, it should be noted that in the latter altered embodiment, which is not illustrated, the backing liner is removed from the sensing marker from the leading edge thereof to the trailing edge thereof, and as a result, the removing operation is smoother.

Figure 7:
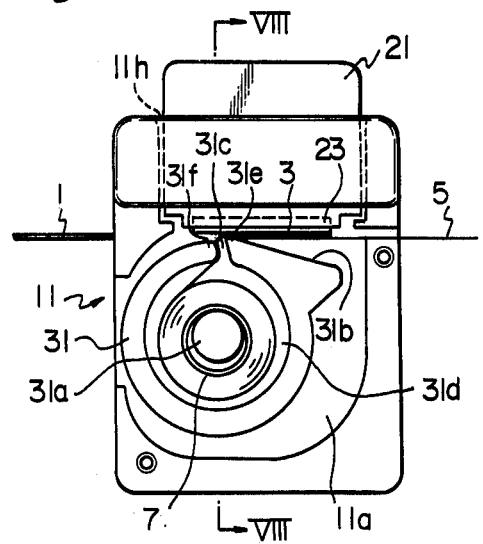
FIG. 7 is an elevational view of the third embodiment of the present invention wherein a transparent cover is removed.
Figure 8:
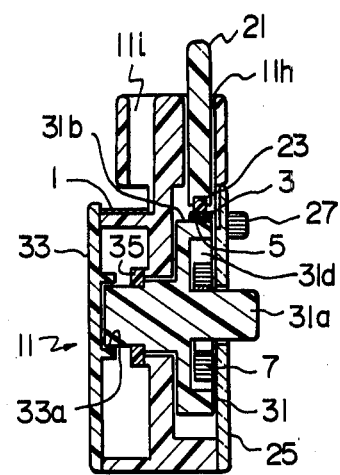
FIG. 8 is a cross sectional view taken along line VIII—VIII in FIG. 7.
Figure 9:
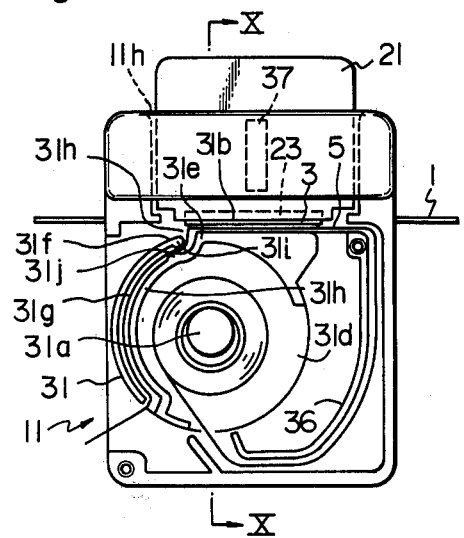
FIG. 9 is an elevational view of the fourth embodiment of the present invention wherein a transparent cover is removed.
Figure 10:
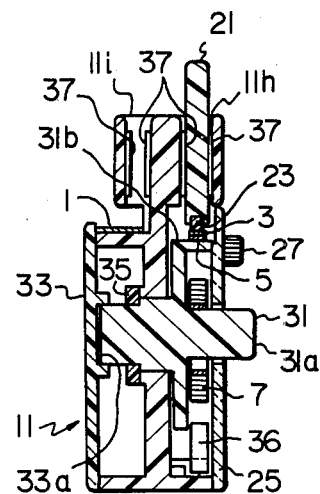
FIG. 10 is a cross sectional view taken along line X—X in FIG. 9.
Figure 11:
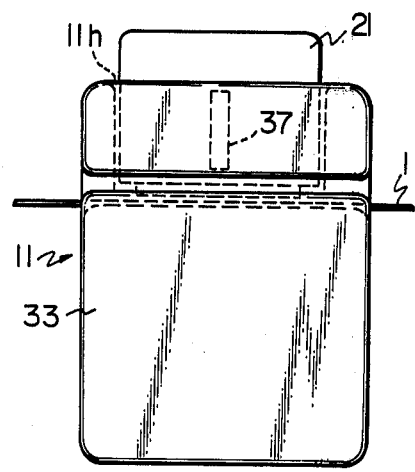
FIG. 11 is a rear view of FIG. 9.
Figure 12:
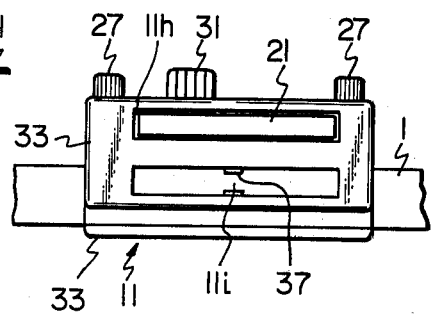
FIG. 12 is a plan view of FIG. 9.
Figure 13:
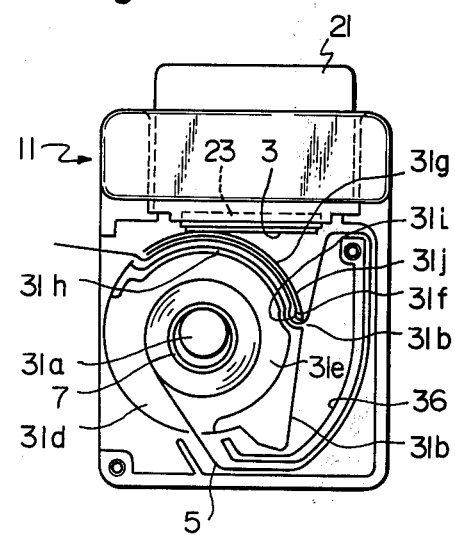
FIG. 13 is an elevational view of the fourth embodiment wherein the sensing marker removing operation is effected.

Referring to FIG. 9, although the marker roll 7 is accommodated within the cavity 31d formed in the removing rotor 31, the backing liner 5 withdrawn from the marker roll 7 is led in a direction opposite to that illustrated in FIG. 7 by guiding the withdrawn backing liner 5 along a guide way 36 which substantially encloses one half of the cavity 31d. The removing rotor 31 comprises the flat surface 31b, an arc path 31g and a radial step 31h connecting the flat surface 31b to the arc path 31g. The radius of the arc path 31g, which radius is a distance between the path 31g and the center of the pivotal movement of the removing rotor 31, is smaller than the distance between the flat surface 31b and the center of the pivotal movement. The arc path 31g is formed between a pair of arcs 31f and 31h. One end of the outer arc 31f is positioned at a position adjacent to the step 31h and the position is the trailing position of the step 31h with respect to the clockwise movement of the removing rotor 31. At the front end of the path 31g, a pair of projections 31i and 31j are formed at the insides of the arcs 31f and 31h, respectively, so that the projections 31i and 31j are staggered and the backing liner 5 inserted therebetween is rigidly held by the projections 31i and 31j while the removing rotor 31 is pivotally moved. An opening formed by the arcs 31f and 31h is utilized to guide the backing liner 5. Inside each of the grooves 11h and 11i, a pair of guide surfaces 37 extends vertically so that the transfer block 21 is precisely guided within the grooves 31f and 31h.

After the marker roll 7 is accommodated within the cavity 31d formed within the removing rotor 31, the removing rotor 31 is located in its original position in FIG. 9, and the backing liner 5 is withdrawn from the marker roll 7 and is fed within the guide way 36, onto the flat surface 31b and into the arc path 31g until the first sensing marker 3 is positioned on the flat surface 31b. The transfer block 21 is inserted into the guide groove 11h and is pressed to the sensing marker 3 positioned on the flat surface 31b so that the sensing marker 3 sticks to the soft material 23 mounted on the block 21. The removing rotor 31 is clockwisely moved by rotating the front end of the pin 31a, and the backing liner 5 is gradually removed from the sensing marker 3 as the removing rotor 31 pivotally moves. The sharp turn of the backing liner 5 path, the pushing effect of the front end of the arc 31f, and the holding effect of the projections 31i and 31j staggered at the entrance of the arc path 31g facilitate the removal of the backing liner 5 from the sensing marker 3. The transfer block 21 is then pulled out from the guide groove 11h, and then, the block 21 is inserted into the guide groove 11i and is pressed to the magnetic tape 1 which has been positioned at the bottom of the guide groove 11i. The removing rotor 31 is then pivotally moved in a counterclockwise direction so that it returns to its original position, and then the backing liner 5 is pulled out until the next sensing marker 3 is positioned on the flat surface 31b.

What we claim is:

1. An appliance for adhering an adhesively-backed sensing marker on a medium for recording information, comprising:

a case adapted to accommodate a marker roll which includes a continuous backing liner and an adhesively-backed sensing marker having a predetermined length and width and adhered on said backing liner;

a removing rotor having a substantially flat surface providing a station for receiving said backing liner withdrawn from said marker roll and disposed in said case pivotably about an axis between a first position, where one of said sensing markers is positioned at said station, and a second position, whereby said sensing marker is removed from said backing liner as the pivotal movement of said removing rotor proceeds from said first position to said second position;

a transferring member having a soft material mounted thereon in the form of a substantially flat surface corresponding to said substantially flat surface of said removing rotor station and capable of being pressed toward said sensing marker on said backing liner at said removing rotor positioned in said first position, whereby said sensing marker is transferred from said backing liner to said soft material as said pivotal movement of said removing rotor proceeds, and then, said sensing marker is transferred from said soft material to said information recording medium positioned at a location for adhering thereon;

said removing rotor having a cavity at the center thereof, which cavity is adapted to accommodate said marker roll coaxially therewith.

2. An appliance according to claim 1, wherein said substantially flat surface of said receiving station is capable of being pressed by said transferring member having said backing liner therebetween, said removing rotor further comprising an arc surface having a radius between said arc surface and said axis, which radius is smaller than the distance between said flat surface and said axis, and a radial step portion connecting said flat surface to said arc surface.

3. An appliance according to claim 1, wherein said removing rotor further includes a finger member at a positon adjacent to said step portion and being a trailing position of said step portion with respect to the pivotal movement of said removing rotor from said first position to said second position so that the separation of said sensing marker from said backing liner is facilitated by said finger member during the pivotal movement of said removing rotor from said first position to said second position.

4. An appliance according to claim 1, which further comprises a guide way, for said backing liner withdrawn from said marker roll, substantially enclosing a region wherein said removing rotor pivotally moves.

5. An appliance for adhering an adhesively backed sensing marker on a medium for recording information, comprising:

a case adapted to accommodate a marker roll which includes a continuous backing liner and an adhesively backed sensing marker having a predetermined length and width and adhered on said backing liner;

a removing rotor having a station for receiving said backing liner withdrawn from said marker roll and disposed in said case pivotally about an axis between a first position, where said sensing marker is positioned at said station, and a second position;

said removing rotor inludes a substantially flat surface which is utilized as said receiving station, an arc surface having a radius between said arc surface and said axis, which radius is smaller than the distance between said flat surface and said axis, a radial step portion connecting said flat surface to said arc surface, and a finger member positioned at a position adjacent to said step portion and being a trailing position of said step portion with respect to the pivotal movement of said removing rotor from said first position to said second position;

said removing rotor having a cavity at the center thereof which cavity is adapted to accommodate said marker roll;

a guide way which substantially encloses a region wherein said removing rotor pivotally moves and which leads said backing liner withdrawn from said marker roll;

a location where said information recording medium is positioned and is adhered with said sensing marker, which location is formed in said case and is provided with a guide surface for widthwisely guiding said information recording medium; and a transferring member having a soft material mounted thereon for removing said sensing marker from said backing liner at said removing station and for transferring said sensing marker therewith to said information recording medium positioned at said adhering location.

6. An appliance according to claim 1 or 5, wherein said soft material is of soft resin.

7. An appliance according to claim 6 wherein the width of said soft material is at most equal to that of said sensing marker.

* * * * *